US011910921B2

(12) United States Patent
Grychta et al.

(10) Patent No.: US 11,910,921 B2
(45) Date of Patent: Feb. 27, 2024

(54) SHELF FOR A WINE CABINET

(71) Applicant: FRIO ENTREPRISE, Arnage (FR)

(72) Inventors: Didier Grychta, Arnage (FR); Cedric Grimault, Ombree d'Anjou (FR)

(73) Assignee: Frio Enterprise, Arnage (FR)

( * ) Notice: Subject to any disclaimer, the term of this patent is extended or adjusted under 35 U.S.C. 154(b) by 0 days.

(21) Appl. No.: 17/722,331

(22) Filed: Apr. 16, 2022

(65) Prior Publication Data

US 2022/0330695 A1 Oct. 20, 2022

(30) Foreign Application Priority Data

Apr. 16, 2021 (FR) ..................................... 21 03952

(51) Int. Cl.

| | |
|---|---|
| ***A47B 73/00*** | (2006.01) |
| ***A47B 96/02*** | (2006.01) |
| ***F25D 25/02*** | (2006.01) |
| ***F21S 8/00*** | (2006.01) |

(52) U.S. Cl.

CPC ............ *A47B 73/00* (2013.01); *A47B 96/021* (2013.01); *F21S 8/00* (2013.01); *A47B 2220/0077* (2013.01); *F25D 25/02* (2013.01); *F25D 25/024* (2013.01); *F25D 2331/803* (2013.01); *F25D 2700/06* (2013.01)

(58) Field of Classification Search

CPC ............ A47B 73/00; A47B 2220/0077; A47B 73/008; A47B 96/021; F21S 8/00; F25D 2331/803; F25D 25/02; F25D 25/024

See application file for complete search history.

(56) References Cited

U.S. PATENT DOCUMENTS 526,309 A * 9/1894 Goerger ............... B65D 85/305 217/19
7,377,397 B2 * 5/2008 Lee ...................... A47B 73/002 211/74
9,752,822 B2 * 9/2017 Lee ....................... F25D 17/045
11,553,806 B2 * 1/2023 Ryu ........................ G07F 9/105
2005/0258118 A1 * 11/2005 Lee ...................... A47B 73/002 211/134
2008/0217270 A1 * 9/2008 Lee ...................... A47B 73/002 211/74
2014/0126829 A1 5/2014 Seeley
2015/0168051 A1 * 6/2015 Lee ........................ F25D 11/02 62/126

(Continued)

FOREIGN PATENT DOCUMENTS

DE 102019110687 A1 * 10/2020
EP 3023720 A1 * 5/2016 ........... A47B 73/008

(Continued)

*Primary Examiner* — Kimberley S Wright
(74) *Attorney, Agent, or Firm* — Craft Chu PLLC; Andrew W. Chu

(57) ABSTRACT

A shelf for storing bottles in a wine cabinet has a rectangular frame bounded by two side beams and two crossbeams, respectively front and rear, and being equipped with individualized reception locations for a plurality of bottles. Each slot has a cradle for the neck of a bottle, the cradle being equipped with a sensor to detect the presence of a bottle neck. The front crossbeam of the shelf can include, for each individualized location, an electronic device to visualize the presence of a bottle.

8 Claims, 2 Drawing Sheets

(56) References Cited

U.S. PATENT DOCUMENTS

| | | | | |
|---|---|---|---|---|
| 2016/0037917 | A1* | 2/2016 | Li | F25D 25/02 211/186 |
| 2020/0029686 | A1* | 1/2020 | Dinter | A47F 7/28 |
| 2020/0214474 | A1* | 7/2020 | Ryu | G07F 11/38 |
| 2022/0074647 | A1* | 3/2022 | Yu | A47F 3/0486 |

FOREIGN PATENT DOCUMENTS

| | | | | |
|---|---|---|---|---|
| EP | 3161398 | A1 | 5/2017 | |
| FR | 2917069 | A1 * | 12/2008 | A47B 47/028 |
| WO | WO-2016036015 | A1 * | 3/2016 | F25D 25/024 |
| WO | WO-2019085965 | A1 * | 5/2019 | A47B 47/00 |
| WO | 2020141834 | A1 | 7/2020 | |

* cited by examiner

SHELF FOR A WINE CABINET

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention very generally relates to the field of wine coolers consisting of a temperature-controlled and hygrometry-controlled cabinet provided with shelves for storing bottles. Said shelves constitute one of the objects of the invention, together with the wine coolers which are equipped with them. The bottles stored in this type of cabinet are kept under special conditions, allowing optimal preservation of each wine awaiting tasting. The cooler of the invention is also equipped with electronic means for managing the bottles stored therein in order to facilitate the management of bottle stocks by its owners.

2. Description of Related Art Including Information Disclosed Under 37 CFR 1.97 and 37 CFR 1.98

The front of the cabinet is fitted with a door for accessing the storage space, in which the bottles are stored horizontally on the superimposed shelves, which must allow storage and access to a maximum number of bottles. For this purpose, each shelf is equipped with spaces for receiving a plurality of bottles, said spaces being individualized and their number optimized on each shelf. This storage by superimposed shelves makes it possible to ensure, on the one hand, the horizontal position of said bottles and, on the other hand, air circulation which allows the even distribution of temperature and humidity in the cabinet.

The wine cooler of the invention can potentially store a great number of bottles, especially if the superimposed shelves are close to each other. However, given that they are preferably installed in rooms where they can be protected from light, for preservation reasons, it is not always easy for the user to determine the spaces actually occupied by bottles on the shelves.

BRIEF SUMMARY OF THE INVENTION

The main objective of the invention is to facilitate the management of the bottles stored in the cooler, in particular by allowing immediate display of the occupied spaces. It should be noted that the implementation of technical means for knowing the status of the places occupied by bottles in the cabinet is a necessary starting point for managing more precisely, possibly with the help of appropriate software applications, the specific bottle type assigned to each space.

To fulfill the objective mentioned above, the shelf of the invention, comprising in practice a rectangular frame delimited by two side members and two crosspieces, front and rear respectively, and equipped with individualized receiving spaces for a plurality of bottles, is such that each space comprises a cradle for the neck of a bottle, said cradle being provided with a sensor for detecting the presence of a bottle neck. Furthermore, the front crosspiece of the shelf comprises, for each individualized space, electronic means for displaying the presence of a bottle.

The detection of the presence of a bottle is therefore carried out at a particular location of the bottle, namely at its neck, and the signal from the sensor is sent to display means so that the user of the cooler can benefit from usable information on the filling rate of their wine cooler.

Preferably, the detection sensor can be placed in the base of the cradle, at a distance of less than or equal to 3 mm from the neck of the bottle, said sensor covering a detection surface of between 8 mm and 12 mm in diameter. One of the difficulties inherent in the problem of detecting this type of item is that wine bottles have different sizes, different glass colors, different collar colors, etc. It is therefore important, so that detection can take place under suitable conditions, to properly control not only the distances between the detection sensor and the object to be detected, but also the spatial coverage of the detection.

According to an advantageous configuration, the sensors are in fact placed in an opening in the base of the cradle with a diameter corresponding to the detection surface. This opening delimits the range of action of the detection means, in particular by being capable of guiding incident waves emitted by a detector when, as is preferably the case in the invention, the sensors are infrared sensors.

According to the invention, the sensors also have the feature of automatically recalibrating after each movement of the bottle, i.e. in practice when placing or removing a bottle. This gives the sensor greater detection sensitivity, considering the context of potentially changing bottle shapes in the same space, according to the use assigned to the shelf. If the sensor retained a calibration linked to the last bottle placed in a space, it would be possible for another type of bottle to no longer be detected due to having a shape that is less close to the sensor. By automatically recalibrating the sensors after any movement of the bottles, it is ensured that each sensor detects each bottle as closely as possible.

More preferably, the display means consist of LEDs placed in the front crosspiece. They are thus visible from the front of the cabinet constituting the wine cooler, either by opening the door with which said front faces are provided in conventional coolers, or through the glass with which these doors may be provided.

According to one possible configuration, the cradles of a shelf can open into the horizontal upper face of a central bar joining the side members of the frame and arranged parallel to the crosspieces, dividing the shelf into two symmetrical half-frames, said central bar comprising a series of n receiving cradles extending therethrough and oriented parallel to the side members, each cradle being of a depth capable of at least partially surrounding the neck of a bottle.

The location of the detections is therefore grouped in a linear configuration, which has a design advantage insofar as all the bottles of the same shelf can be detected regardless of their position relative to said shelf.

Specifically, according to the invention, each half-frame is provided with at least two bottle supports joining the side members, each support comprising centering arches for n/2 bottles; said arches each being arranged in the axis of every other cradle of the central bar, the arches of the supports placed in a half-frame being offset by the transverse width of a cradle with respect to the arches placed in the other half-frame.

The bottles are therefore arranged head to tail on a shelf, so as to maximize storage options while allowing their presence to be measured in a single location: the central bar. It should be noted that the shelves are movable in the manner of a drawer, in order to be able to easily access each space, even those which are further back in the interior volume of the cabinet.

According to one possible configuration, each cradle can have a flat base and rounded edges with a circular arc section. The opening housing the detection sensor is then preferably placed centrally in the transverse dimension of the cradle, which offers the best detection scope in the event of somewhat imprecise positioning of the bottles in their arches.

Given that each shelf comprises n sensors and for example n light signaling devices, it comprises an electronic module 26 for processing the signals from and to the sensors and the electronic display means. It is obviously necessary that the signals from each pair of components—made up of a sensor and an LED—corresponding to a bottle space be managed, first at the shelf but potentially also in a more general way, so that the user can get an idea, for example, of the filling rate of his wine cabinet, or even of the presence of certain wines.

Thus, the electronic module 26 may comprise means 27 for transmitting/receiving data from the processing, for example intended for an electronic central unit in the cabinet (see in more detail below). Centralization of the data of the different shelves provided in the cabinet can then allow for more extensive management of the occupancy status of the shelves, if necessary and as mentioned above using suitable software applications.

The invention also relates to a wine cooler provided with shelves as described above, conventionally provided with a door for accessing said superimposed shelves, and such that it comprises a door contact connected to a power supply for the sensors and display means, said contact being closed when the door is open, and open when the door is closed. The existence of this contact makes it possible to keep the energy level necessary for managing the shelves to a minimum, in the knowledge that said shelves do not necessarily need to be permanently powered, in particular when the cabinet is closed. This is therefore an energy saving mode.

Furthermore, as mentioned above, the wine cooler of the invention may comprise an electronic central unit for managing the sensors and the display means, provided with transmitter and receiver devices capable of exchanging information with the transmitting/receiving means of the shelves. Preferably, said transmitter and receiver devices and the transmitting/receiving means of the shelves operate without wired connections, using radiofrequency waves.

This type of non-wired link is in particular much more suitable due to the mobile nature of the shelves, which move by sliding in the manner of a drawer, and for which the wired connections are reserved for the necessary power supply. According to an example of radiofrequency links used for data exchange between the shelves and the central unit of the cabinet, it may be the communications standard known as Bluetooth (for example in low energy), which is based on radio waves operating in the same frequency band as Wi-Fi, namely in the 2.4 GHz band.

BRIEF DESCRIPTION OF THE SEVERAL VIEWS OF THE DRAWINGS

Other aims and advantages of the present invention will become apparent throughout the following description, which is in particular based on a particular embodiment which is given only by way of an indicative and non-limiting example. The understanding of this description will be facilitated in particular by reference to the attached figures.

DETAILED DESCRIPTION OF THE INVENTION

Figure 1:
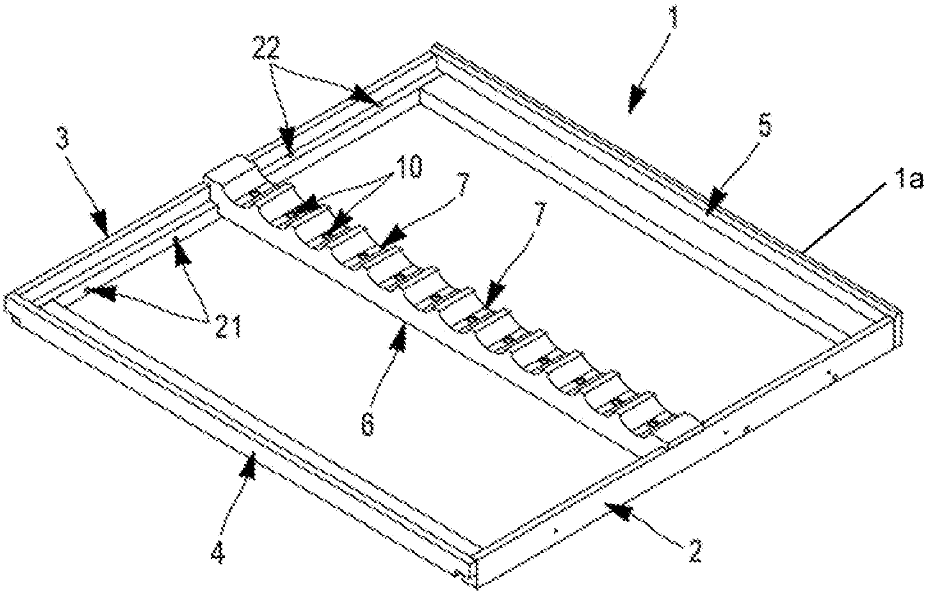
FIG. 1 represents a perspective view of a shelf according to the invention, in view of three quarters back.
Figure 2:
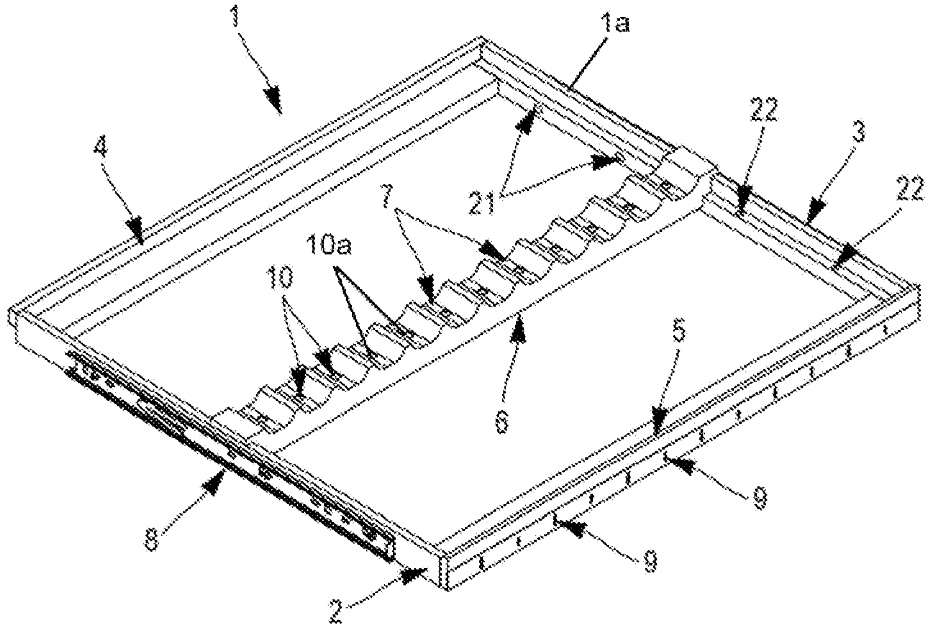
FIG. 2 shows a perspective view of this shelf, this time seen from three quarters forward.

Referring to FIGS. 1 and 2, the shelf 1 very generally comprises a frame (rectangular frame 1*a*) formed of two side members 2, 3 (a first side beam 2, a second side beam 3), two crosspieces 4, 5 (a rear cross beam 4, a front cross beam 5), and a central bar 6 provided with cradles 7 shaped to accommodate lower necks/necks of bottles. The side members 2, 3 (a first side beam 2, a second side beam 3) are provided with rails 8 (only that of the side member 2 appears in FIG. 2) which allow them to slide in the slides fitted to the side walls of the cabinet of the wine cooler (not shown). The front crosspiece (front cross beam) 5 further comprises light-emitting diodes 9 (LEDs) (electronic means of visualizing presence in the rectangular frame), in a number equal to the number of bottles which can be stored in the shelf 1, in this case twelve.

The upper face of the central bar 6 comprises a series of identical cradles 7, the bases of which have, on their flat central portions, a sensor 10 placed in an opening with a diameter in this case equal to 10 mm. The sensors 10 are installed on a non-visible printed circuit board placed in the hollow body of the central bar 6, which in particular manages their power supply and the signals coming therefrom. The association of the detector 10 and the opening makes it possible to control the spatial coverage of the detection, which is guided in the manner of a waveguide by the tube which in practice is constituted by the opening. The necks, and more particularly the lower necks of the bottles, are positioned in the cradles 7 at a maximum distance of 3 mm from the sensors 10, allowing the detection of a bottle.

In the possibility shown in the figures, the shelf 1 is equipped with twelve infrared IR sensors all installed on a single elongate electronic board located inside the central bar 6 of the shelf 1. The shape of said shelf 1 has in fact been designed to accommodate very different bottle shapes, for example but not exclusively bottles of Champagne, Alsace, Bordeaux, Burgundy, Jura, Anjou, Prosecco, Mateus wine, etc. In short, it is possible to store any bottle up to 10-12 cm in diameter, depending on the spacing between shelves, with bottle sizes up to 100 cl. The shelf 1 of the invention allows optimized storage, head to tail, of all these sizes and shapes of bottles.

Figure 3:
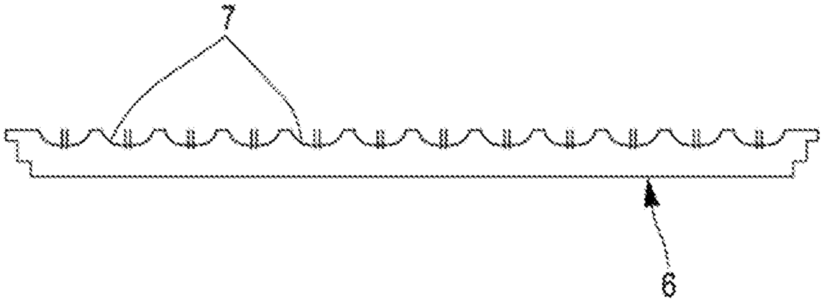
FIG. 3 illustrates a longitudinal sectional view of the central bar.

FIG. 3 shows with greater precision the shape of the cradles 7, in each case showing the precise space allocated to the sensors 10 (indicated by the vertical parallel lines projecting from the flat segments indicating the flat base of the cradles 7). This space is in practice linked to the opening connecting the printed circuit board on which the sensors 10 are installed, which is housed inside the central bar 6, and the cradles 7 housing the necks of the bottles, on the upper face of said central bar 6.

In the same manner, the front crosspiece 5 is equipped with an electronic board (electronic module 26) managing the power supply of twelve indicator lights connected to the sensors of the central bar, reflecting the movements of the bottles by indicating the presence or the absence of said bottles, resulting from the individualized signals from the sensors. The appearance given to the front of this crosspiece 5 preferably makes it possible to distinguish the exact positions of the bottles, placed either at the front or at the rear of the shelf 1, on either side of the central bar 6. The two printed circuit boards (electronic module 26) are connected by wiring arranged inside one of the side rails 8 (see FIG. 2).

Figure 4:
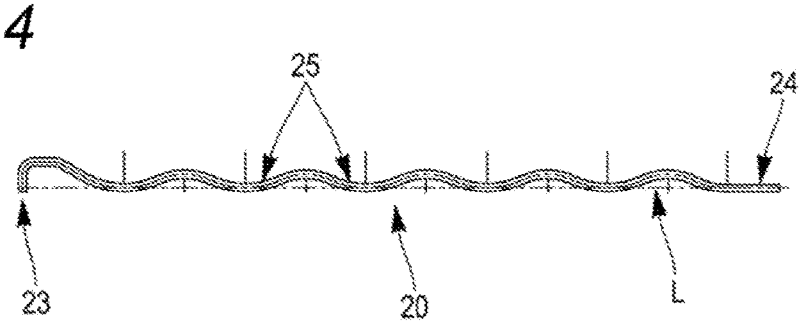
FIG. 4 represents an elevation view of a support of bottles with arches preferably used in the shelves of the invention.

The bottle holder 20 shown in FIG. 4 is the same regardless of its position in the shelf 1, it is only mounted in one direction when it is in a half-frame of the two symmetrical half-frames 1*b*, 1*c* and in the opposite direction when in the other half-frame of the shelf 1, as explained in detail below (see FIG. 5). These supports 20 are rods 25*a*, for example metal rods of uniform diameter, which are shaped to have arches or loop portions 25 for supporting the bodies of the bottles. More specifically, the ends 23, 24 of the support 20 assume two perpendicular orientations, the end 23 being vertical while the opposite end 24 being horizontal. The support 20 is shown—in FIG. 4—with the same generally horizontal orientation as when it is mounted in shelf 1 as seen in FIG. 5.

Returning to FIGS. 1 and 2 showing the frame 1*a* of the shelves 1 without the supports 20, the inner sides of the side members 2, 3 have openings 21, 22 which are not oriented in the same manner, on each side member 2, 3, according to the half-frame to which they belong. Thus, in a half-frame, the openings 21 are horizontal, therefore designed to interact with the ends 24 of the supports 20. In the other half-frame, on the same side member but on the other side of the central bar 6, the openings 22 are provided vertically on a shoulder, and they are therefore provided to cooperate with the ends 23 of the supports 20. Each half-frame has in practice the two types of openings 21, 22 on the opposing side members 2, 3. Thus, in the same half-frame, the horizontal openings 21 are on the side member 3, while the vertical openings 22 are provided on the side member 4. In the other half-frame, it is the opposite.

Figure 5:
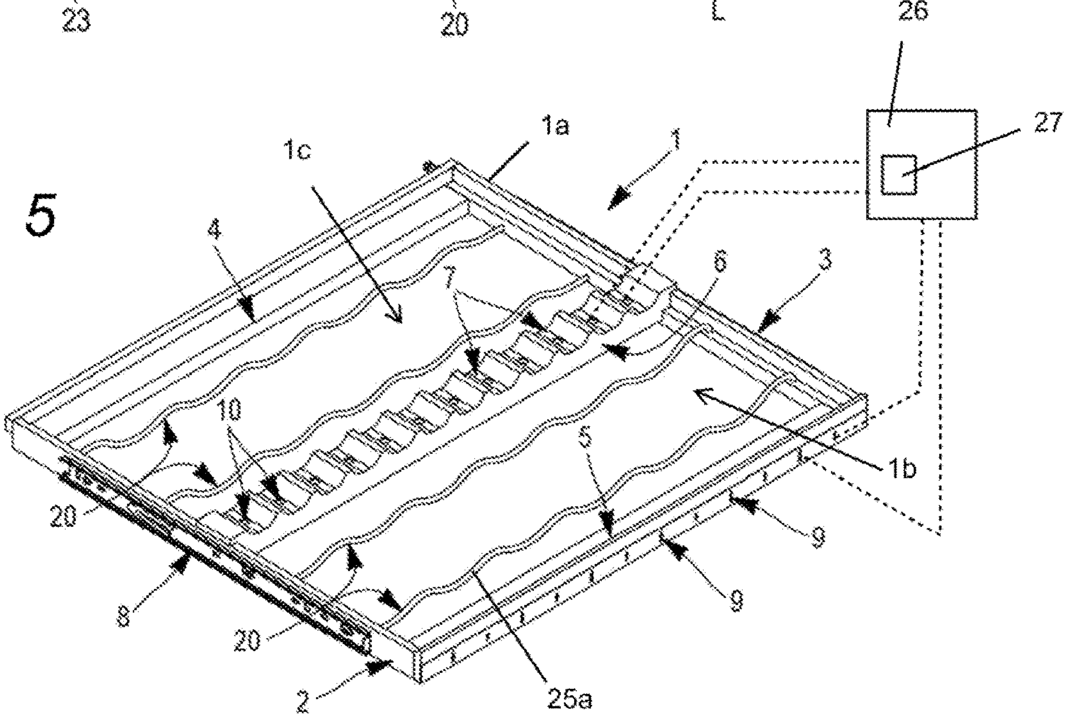
FIG. 5 represents a perspective view of a complete shelf, i.e. equipped with four bottle holders as shown in FIG. 4.

Therefore, the metal supports 20 as shown in FIG. 4 are mounted in one direction in a half-frame, and turned horizontally by 180° in the other half-frame, as shown in FIG. 5. This results, from one half-frame to the other, in an offset of the arches or loop portions 25 which makes it possible to "target" the other cradles 7 of the central bar 6 when the bottles are stored and rest on the arches 25. Since said arches or loop portions 25 have a lower periodicity than that of the cradles 7, the two supports 20 which are installed in a half-frame support bottles of which the necks are placed in every other cradle 7 of the central bar 6, thus leaving one out of every two empty. The supports 20 fixed in the other half-frame, as a result of this offset, place the bottles in the axis of the unoccupied cradles, so that if all the bottle spaces are occupied, all the cradles 7 are also occupied. The bottles are then found head to tail, in the opposite direction according to the half-frame in which they are stored.

The line L (see in FIG. 4), which substantially shows the support level of the bodies of the bottles, is placed under the flat base of the cradles 7 as evidenced by the location of the horizontal openings 21 for attaching the ends 24 (see in particular in FIG. 1), so that when the bottle rests in an arch or loop portion 25, its neck is at least partially housed in a cradle 7. Bottle detection then becomes possible. It should be noted that it would certainly be possible to detect the bottle in other positions along the length of said bottle, for example at its body, but this would imply the management of two sets of sensors linked to two separate electronic boards, which is economically less advantageous.

The shelf 1 of the invention makes it possible to detect the presence or absence of bottles solely at the central bar 6, and information on the presence or absence of bottles is sent to the indicator lights (electronic means of visualizing presence in the rectangular frame) 9 installed on the front face of the front crosspiece 5. The shape of the cradle 7, being simple in appearance, is actually designed to accommodate various bottle shapes. Thus, its axial length is such that the part of the bottle which interacts with the cradle 7, or comes into contact with it, is not always the same: it may indeed be the lower neck, the shoulder or the neck of the bottle.

For very elongate bottles, for example of the type of bottles of Alsace wine, there is no clear separation between the lower neck and the body, but a continuity of shape which makes it possible to pass smoothly from the body to the lower neck. In this case, the shoulder of the bottle can rest on the axial end edge of the cradle 7, which, according to the invention, maintains the neck within the limit of 3 mm distance from the sensor 10.

The configuration of the shelf makes it possible in practice to ensure optimal operation of the management of the detection of the different shapes and configurations of bottles, as well as the colors of the collars.

It should be noted that the configuration example given above with reference to the attached figures is neither exhaustive nor limiting of the invention, which in particular encompasses shape variants for the cradles 7, the supports 20, etc.

We claim:

1. A shelf for storage of bottles in a wine cabinet, comprising:

a rectangular frame being comprised of a first side beam, a second side beam, a front cross beam between said first side beam and said second side beam, and a rear cross beam between said first side beam and said second side beam and across from said front cross beam;

a central bar extending from said first side beam to said second side beam, having a horizontal upper face, and being comprised of a plurality of cradles on said horizontal upper face, and a plurality of sensors, each cradle of said plurality of cradles being equipped with a respective sensor of said plurality of sensors; and an electronic means of visualizing presence in said rectangular frame, said electronic means being on said front cross beam, wherein each cradle of said plurality of cradles is positioned on said central bar so as to detect a neck of a bottle with a corresponding sensor of each cradle of said plurality of cradles, wherein the electronic means is positioned on said front cross beam so as to detect a cylindrical body of the bottle by visualizing said cylindrical body, wherein said central bar is arranged parallel to said front cross beam and said rear cross beam so as to divide said rectangular frame into two symmetrical half-frames, and wherein each cradle of said plurality of cradles is oriented parallel to said front cross beam and said rear cross beam, wherein each half-frame of said two symmetrical half-frames is comprised of: two supports between said first side beam and said second side beam, wherein each support of said two supports is comprised of a rod with a plurality of loop portions, and wherein each loop portion is positioned relative to a corresponding cradle of said plurality of cradles and said front cross beam so as to support the bottle in said rectangular frame so as to detect the neck of a bottle with a corresponding sensor of each cradle of said plurality of cradles and the cylindrical body of the bottle by visualizing said cylindrical body.

2. The shelf, according to claim 1, wherein each sensor of said plurality of sensors is placed in a bottom of a respective cradle of said plurality of cradles so as to be positioned at a distance less than or equal to 3 mm from the neck of the bottle, wherein each sensor of said plurality of sensors has a detection area covering between 8 mm and 12 mm in diameter.

3. The shelf, according to claim 2, wherein each sensor of said plurality of sensors is placed in an orifice at said bottom of the respective cradle of said plurality of cradles.

4. The shelf, according to claim 1, wherein each sensor of said plurality of sensors is an infrared sensor.

5. The shelf, according to claim 1, wherein said electronic means of visualizing presence in said rectangular frame is comprised of a light-emitting diode placed in said front cross beam.

6. The shelf, according to claim 1, wherein each cradle of said plurality of cradle has a flat bottom shape with rounded arcuate banks.

7. The shelf, according to claim 1, further comprising: at least one electronic module in communication with said plurality of sensors and the electronic means for visualizing so as to process signals from and to said plurality of sensors and the electronic means of visualizing.

8. The shelf 1, according to claim 1, wherein said electronic module comprises means of transmitting/receiving data.

* * * * *